United States Patent [19]

Fernekes et al.

[11] 4,390,257
[45] Jun. 28, 1983

[54] HAND HELD VIEWER FOR VARIOUS SIZE FILMS

[75] Inventors: Robert W. Fernekes; Murray V. Tesser, both of Martinez, Ga.

[73] Assignee: Senscom Corporation, Evans, Ga.

[21] Appl. No.: 237,084

[22] Filed: Feb. 23, 1981

[51] Int. Cl.³ .............................................. G03B 1/50
[52] U.S. Cl. ........................................ 353/95; 40/364; 40/367; 353/104; 353/DIG. 2
[58] Field of Search ................................. 40/361–367; 353/104, 68, 95, 122, 119, 43, DIG. 2

[56] References Cited

U.S. PATENT DOCUMENTS

| | | |
|---|---|---|
| 1,943,673 | 1/1934 | Hudson . |
| 2,153,221 | 4/1939 | Wittel ............................ 353/104 X |
| 2,231,743 | 2/1941 | Young ................................... 353/96 |
| 2,410,722 | 11/1946 | Eckert ............................. 40/364 X |
| 2,512,314 | 6/1950 | Dutton . |
| 2,550,799 | 5/1951 | Fuller .................................... 40/364 |
| 3,045,541 | 7/1962 | Bregman ........................ 353/104 X |
| 3,404,472 | 10/1968 | Leahey et al. . |
| 3,472,584 | 10/1969 | Arens . |
| 3,675,354 | 7/1972 | Webb . |
| 3,719,419 | 3/1973 | Davee . |
| 3,803,737 | 4/1974 | Beckett . |
| 4,050,809 | 9/1977 | Boggs . |
| 4,081,920 | 4/1978 | Magee . |

FOREIGN PATENT DOCUMENTS 1403259   5/1965   France .................................. 353/95

OTHER PUBLICATIONS

Singer "Audio Visual Projectors" Auto-Vance II & Auto-Vance III p. 8.
Avas "Slide Viewer #4" Jul. 1978, Cat. p. 18.
Standard "35 MM Silent Filmstrip Projectors" Model 1995 p. 3.

Primary Examiner—Harry N. Haroian
Attorney, Agent, or Firm—Finnegan, Henderson, Farabow, Garrett & Dunner

[57] ABSTRACT

A compact film viewer for film strips of various sizes including a removable channel guide with a central opening disposed transverse a case between a light source and a lens and a film channel interchangeably received in the channel guide for slidably receiving film strips. The film channel is sized for a particular film and has a central opening corresponding to film frame size to prevent passage of excess light from the light source to the lens when viewing the film.

17 Claims, 12 Drawing Figures

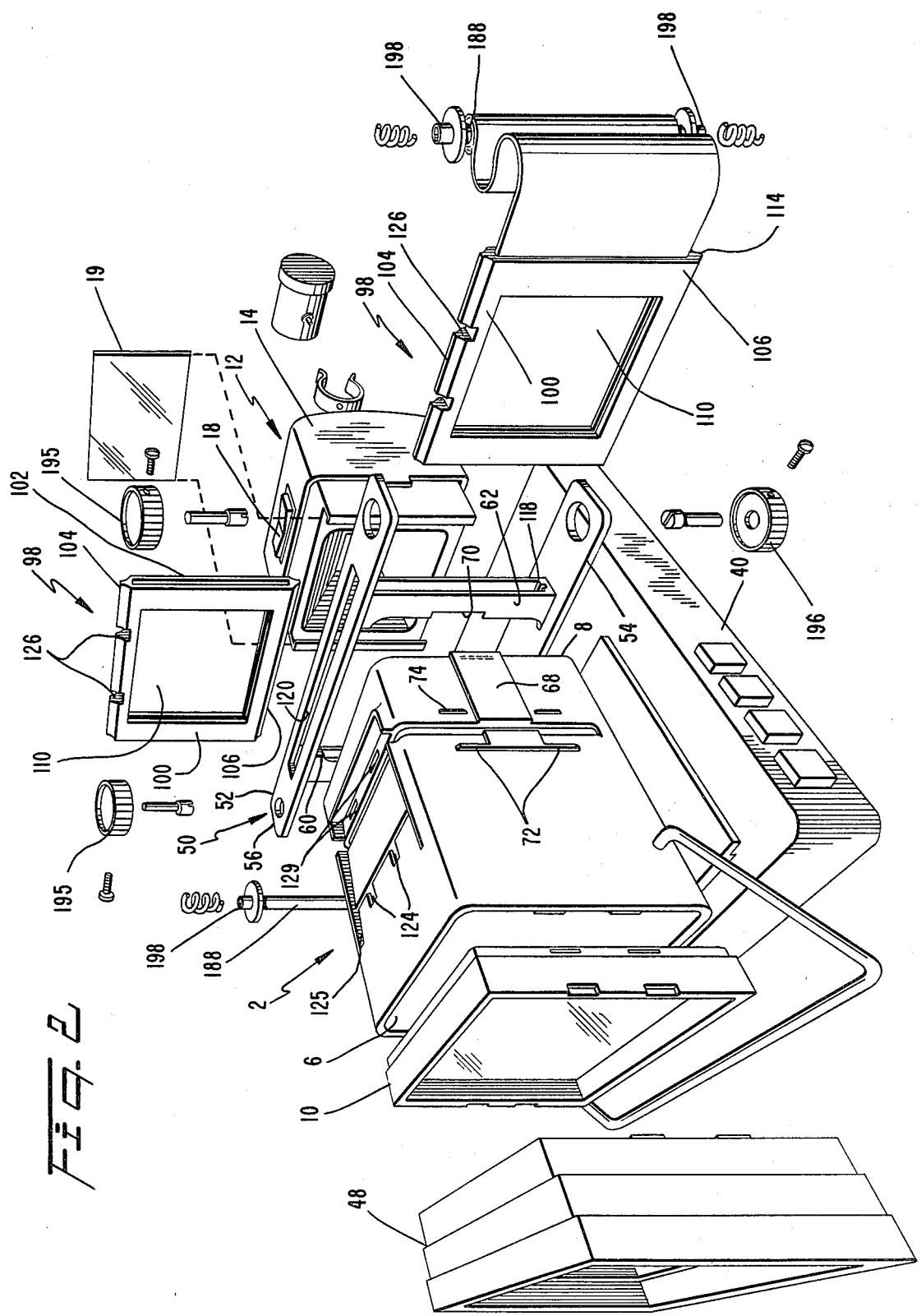

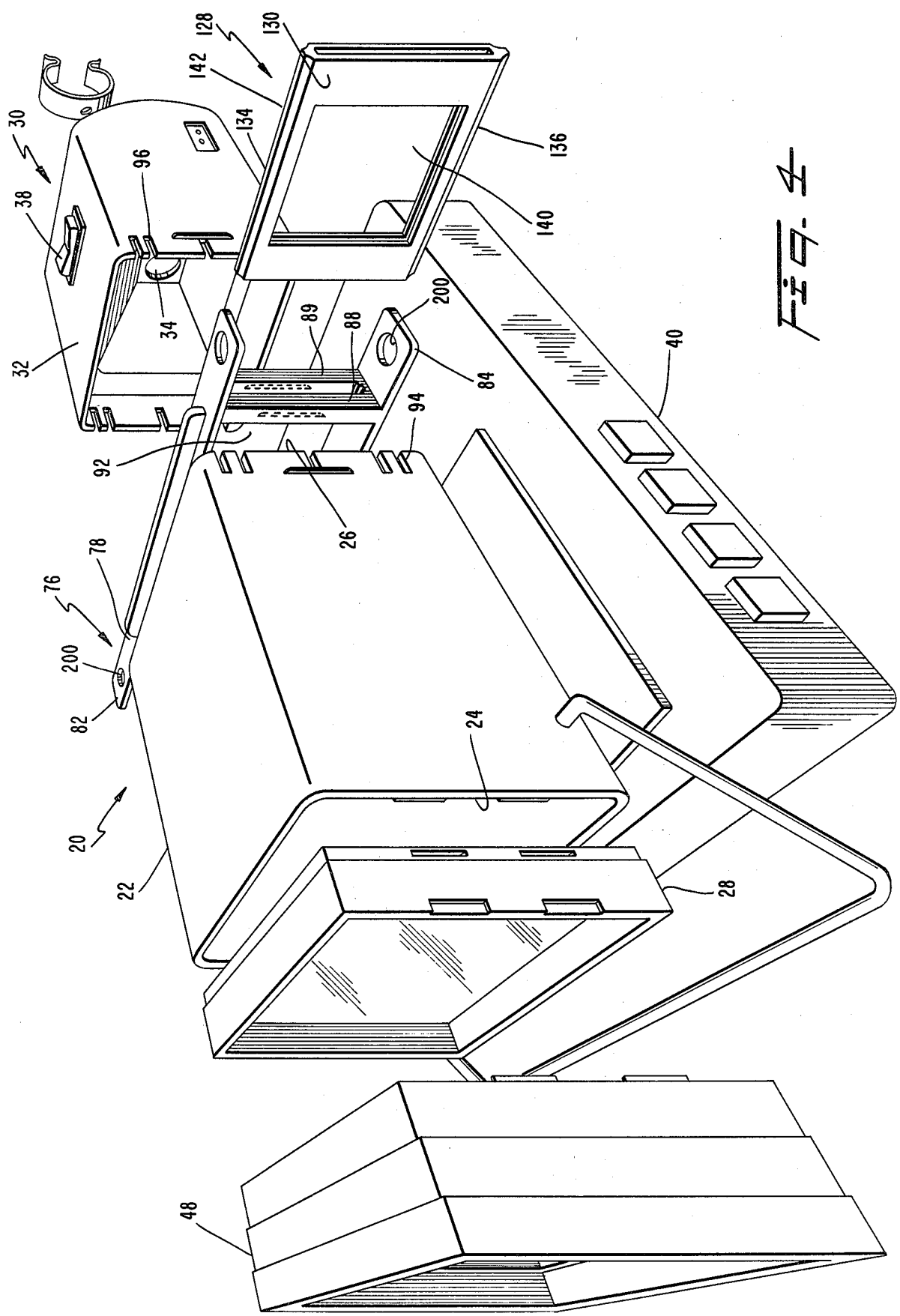

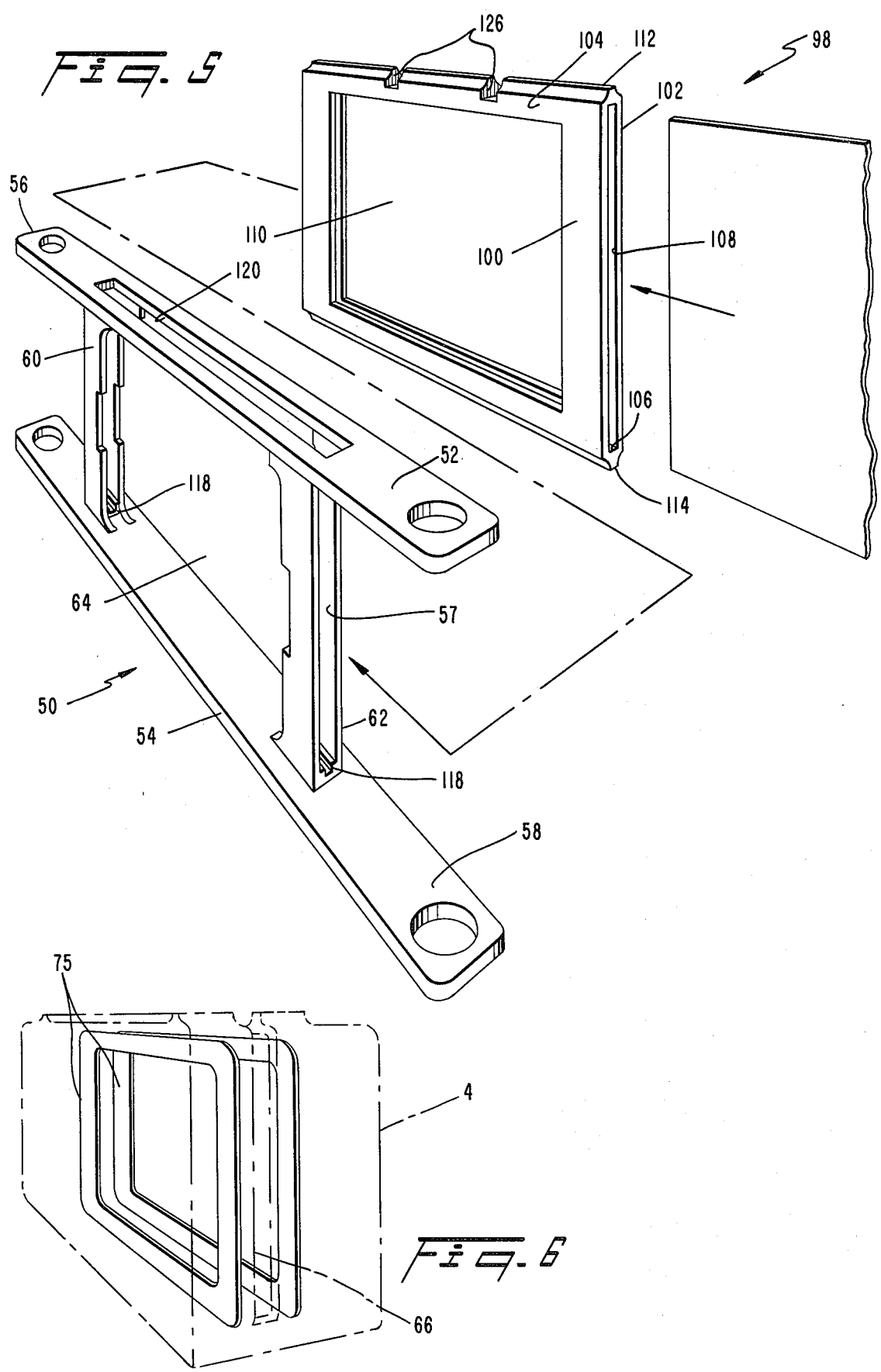

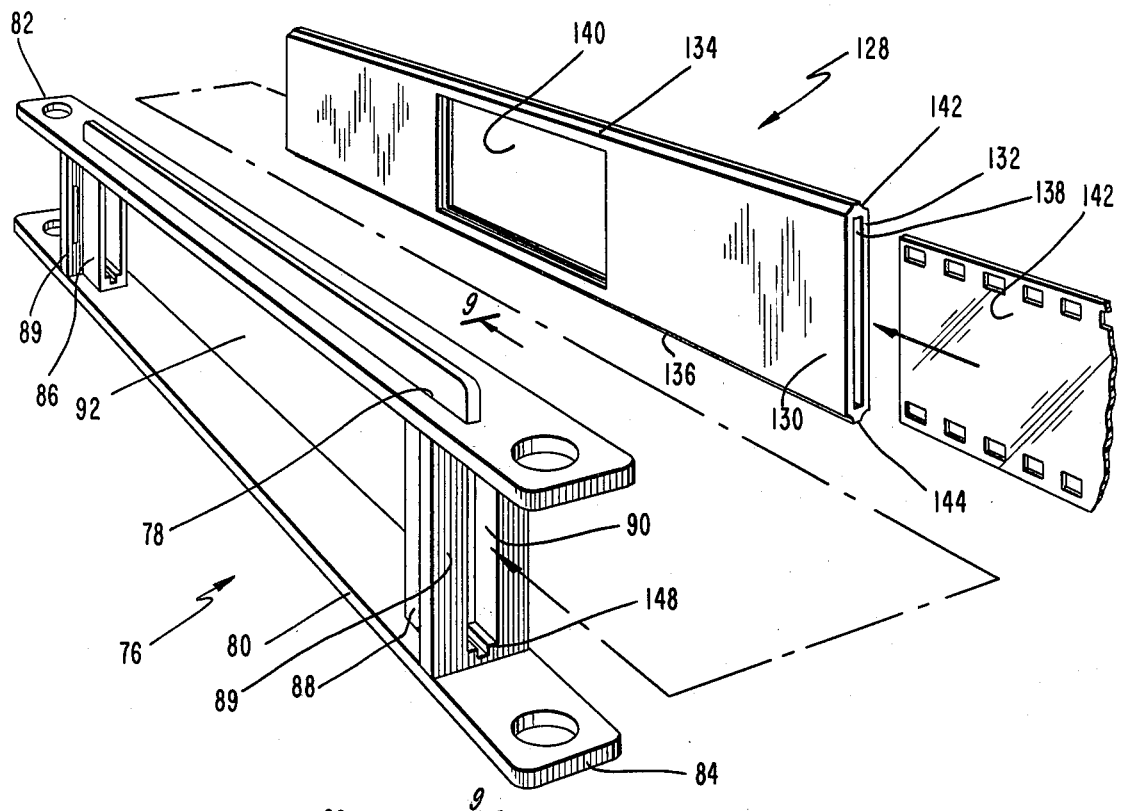
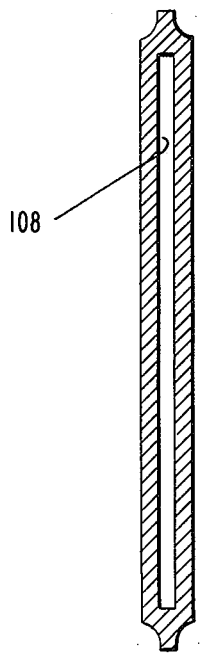
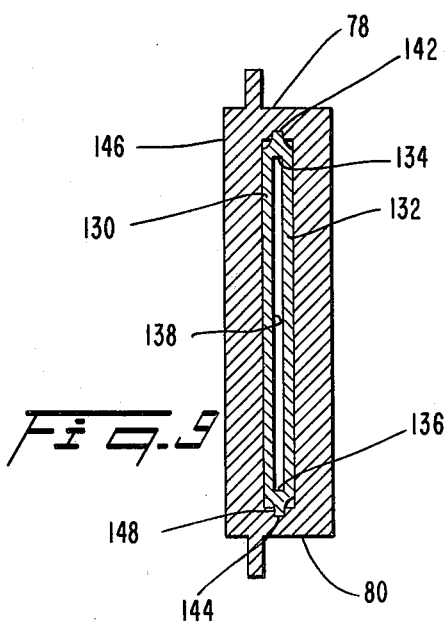

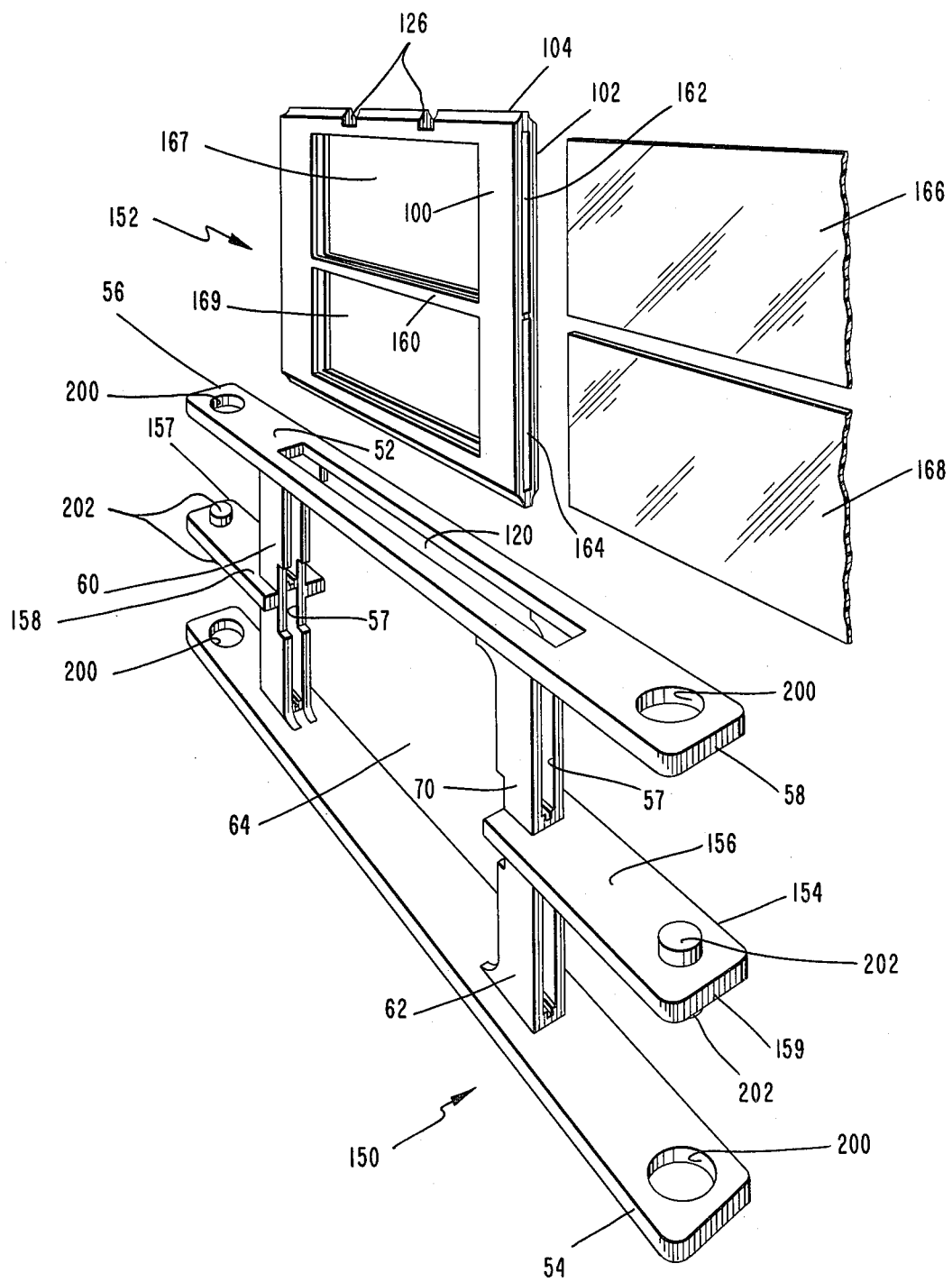

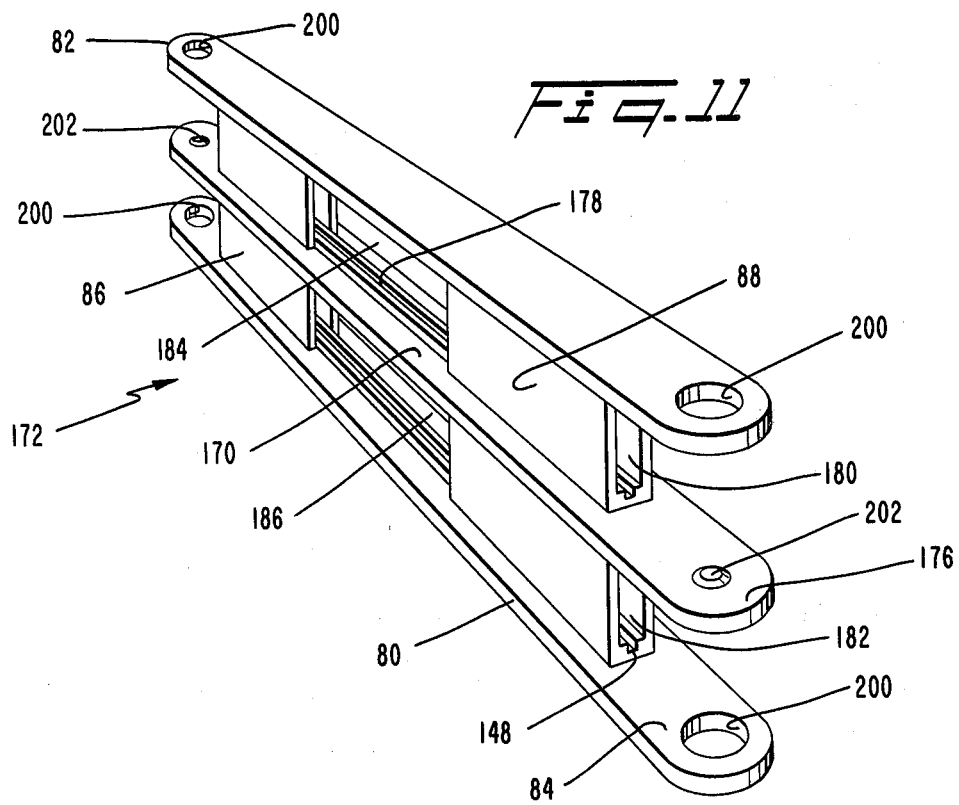
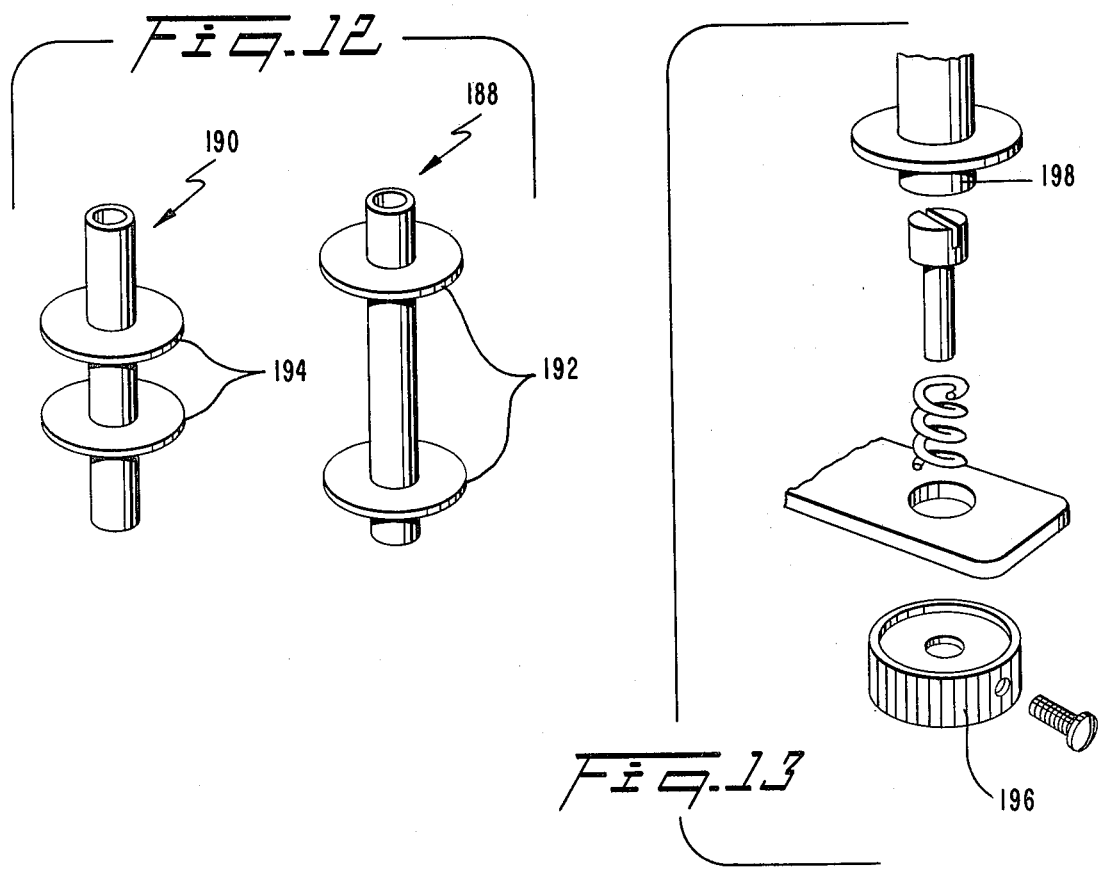

HAND HELD VIEWER FOR VARIOUS SIZE FILMS

BACKGROUND OF THE INVENTION

1. Field of the Invention

This invention relates to film viewers. More particularly, the invention relates to hand held film viewers capable of accommodating various sizes of film without disassembly of the viewer or time consuming modifications to the viewer. Additionally, the invention relates to hand held film viewers permitting simultaneous viewing of two films.

2. Description of the Prior Art

Today, there is a great need for new and useful instructional aids, especially job performance aids. Specifically, the education community in concert with industry is constantly seeking means to economically and effectively train large numbers of personnel in the shortest possible time. Books are, of course, traditional teaching aids. However, it has been discovered that reading and comprehension skills of personnel do not keep pace with the advancing sophistication of equipment. Therefore, more training and new techniques are required as equipment becomes more complex to use and maintain.

Accordingly, trainers/instructors have investigated the increasing use of films as a teaching aid. However, the viewing of films, particularly film strips, have generally required the use of large, cumbersome projectors requiring a stable surface on which to place the film projector and a screen on which to project the image. Obviously, such projectors have no effective utility outside the classroom. One simply cannot take a film projector to the top of a telephone pole, or under a vehicle.

More recently, film viewers have been developed which permit the viewing of film through a lens contained in the film viewer; however, these film viewers generally have been large and required a surface on which to place the viewer for use. While some of the latter film viewers have been portable to the extent that they are contained in briefcases or other reasonably convenient carrying cases, their size provides only limited convenience, and they have been relatively expensive. Accordingly, such viewers have little utility in providing on-the-job instruction.

In addition to cumbersome size and high cost, existing film viewers have generally provided limited versatility. While some film strip viewers provide a capability for accommodating a particular size of film strip in addition to slides, these viewers are limited to one size of film strip and require significant adjustment or modification of the viewer to accommodate slides.

Frequently, for purposes of educational presentation, it is desirable to view two films simultaneously. Examples, include, but are not limited to, overview/closeup, picture/explanation comparisons, and branching. While the learner progresses with the primary program, the distinct advantage is that the secondary program frame may remain in view or be advanced accordingly. This requirement also frequently is encountered when it is necessary to compare two films such as comparing a master to a copy or comparing an original to a revised version of a film. Existing film viewers do not provide such capability.

The present invention provides a film viewer which permits quick and easy changing from one size film to another without significant adjustment of the viewer or disassembly of the viewer. In particular, the present invention provides for the viewing of various size film strips which may be easily installed for sliding movement between a light source and a lens. Additionally, the present invention provides a simple means for viewing two films simultaneously by exchanging a single channel guide for a dual channel guide. Furthermore, the film viewer of the instant invention is compact and capable of being hand held while in use.

SUMMARY OF THE INVENTION

To achieve the foregoing benefits and advantages over existing film viewers and in accordance with the purpose of the invention, as embodied and broadly described herein, a compact viewer for film strips of various sizes comprises a substantially hollow case open at one end thereof, a lens secured to the open end of the case, and a light source for projecting light through the case and the lens.

A channel guide means is provided disposed transverse the case between the light source and the lens for guiding and holding a film channel means. The film channel means is removably disposed vertically or horizontally in the first embodiment in the channel guide means and the film channel means is designed for slidably receiving and aligning film strips and for sequentially framing frames of the film strips between the light source and the lens. A plurality of interchangeable film channel means are provided, each film channel means being adapted to slidably receive film of a particular size and having an opening to permit passage of light from the light source through the film to the lens, the size of the opening substantially corresponding to the particular size of the frame of the particular film.

Preferably, the channel guide means comprises elongated top and bottom members with opposed ends and two pair of spaced, parallel walls secured between the top and bottom members defining a longitudinal passage between the opposed ends. One pair of walls is located proximate each opposed end and longitudinally spaced from the other pair of walls to provide a central opening. The top member includes an opening for vertical installation of film channel means into the central opening, in alignment with the longitudinal passage.

The case includes a transverse slot between the light source and the lens, and the channel guide means is preferably designed to permit insertion of the case through the central opening with the slot of the case in cooperative alignment with the longitudinal passage of the channel guide means.

Another embodiment of the invention provides a channel guide means transversely mounted in the case with the opposed ends extending outside the case and the central opening disposed between the light source and the lens. Preferably, the viewer includes spool means rotatably secured to each of the opposed ends of the channel guide means for holding and slidably moving the film through the film channel means.

In this embodiment, the channel guide means is mounted in the case between the light source and the lens, and the channel guide means includes top and bottom members with opposed ends and two pair of spaced, parallel walls secured between the top and bottom members defining a longitudinal passage between the opposed ends, one pair of walls being located proximate each opposed end and spaced apart to provide a central opening. The channel guide means includes a transverse slot for receipt of the film channel means.

Preferably the film channel means comprises a pair of parallel spaced walls, and top and bottom members joining the walls to define a film receiving passage, the walls having centrally located openings of the size substantially corresponding to the frame size of the film received in the passage to permit passage of light from a light source through the film to the lens. Individual film channel means are provided having varying dimensions for the film receiving passage and varying dimensions for the openings so as to accommodate films of sizes such as, but not limited to, 56 mm×56 mm (commonly referred to as 2¼″), 56 mm×41.5 mm, 36 mm×24 mm (commonly referred to as 35 mm), half frame 35 mm, 16 mm and 8 mm.

In another embodiment of the invention, the channel guide means includes an elongated middle member substantially congruent with and disposed midway between and parallel to the top and bottom members for defining two longitudinal, parallel passages between the opposed ends of the channel guide means, and dividing the central opening into two adjacent central openings. Each of the longitudinal passages receives a film channel means permitting light from the light source to simultaneously pass through two films to the lens. Spool means are rotatably secured to each of the opposed ends of the channel guide means for holding and slidably moving the two films through the respective film channel means.

The accompanying drawings, which are incorporated in and constitute a part of this specification, illustrate embodiments of the invention and, together with the description, serve to explain the principles of the invention.

BRIEF DESCRIPTION OF THE DRAWINGS

FIG. 2 is an exploded view of the film viewer of FIG. 1.

FIG. 4 is an exploded view of another embodiment of the film viewer of the invention.

FIG. 5 is a perspective view of the film channel guide means and the film channel means of the embodiment of FIG. 2.

FIG. 6 is an exploded view of the inside of a transverse slot shown in FIG. 2.

FIG. 7 is a perspective view of the film channel guide means and the film channel of the embodiment of FIG. 4.

FIG. 8 is a side view of the film channel means of FIG. 5.

FIG. 9 is a sectional end view of the film channel guide means of FIG. 7 with the film channel means in place.

FIG. 10 is a perspective view of another embodiment of a channel guide means and film channel means.

FIG. 11 is another embodiment of the film channel guide means of the embodiment of FIG. 10.

FIG. 12 is a perspective view of two alternative spool means for use with the film viewer of the invention.

FIG. 13 is an exploded view of a spool assembly should in FIG. 2.

DESCRIPTION OF THE PREFERRED EMBODIMENT

In accordance with the invention, the hand held viewer for strips of film of various sizes comprises a substantially hollow case open at one end thereof, a lens secured to the open end of the case and a light source for directing light through the case and lens.

Figure 1:
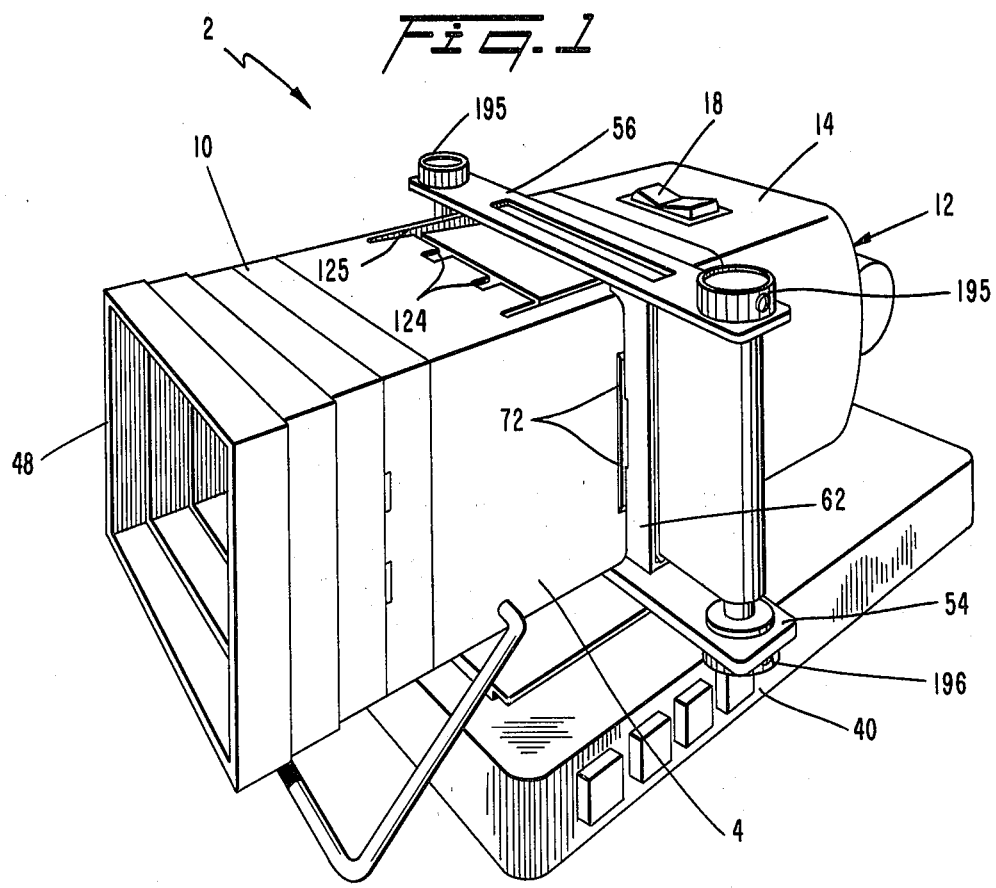
FIG. 1 is a perspective view of one embodiment of the film viewer of the instant invention.

As embodied in FIGS. 1 and 2, the film viewer 2 includes a substantially hollow case 4 having open ends 6,8. A lens 10 is secured to case 4 at open end 6 and a light source 12 is secured to the other open end 8. Lens 10 is removable, and may be replaced with a lens of optical characteristics corresponding to the size film in use.

Figure 3:
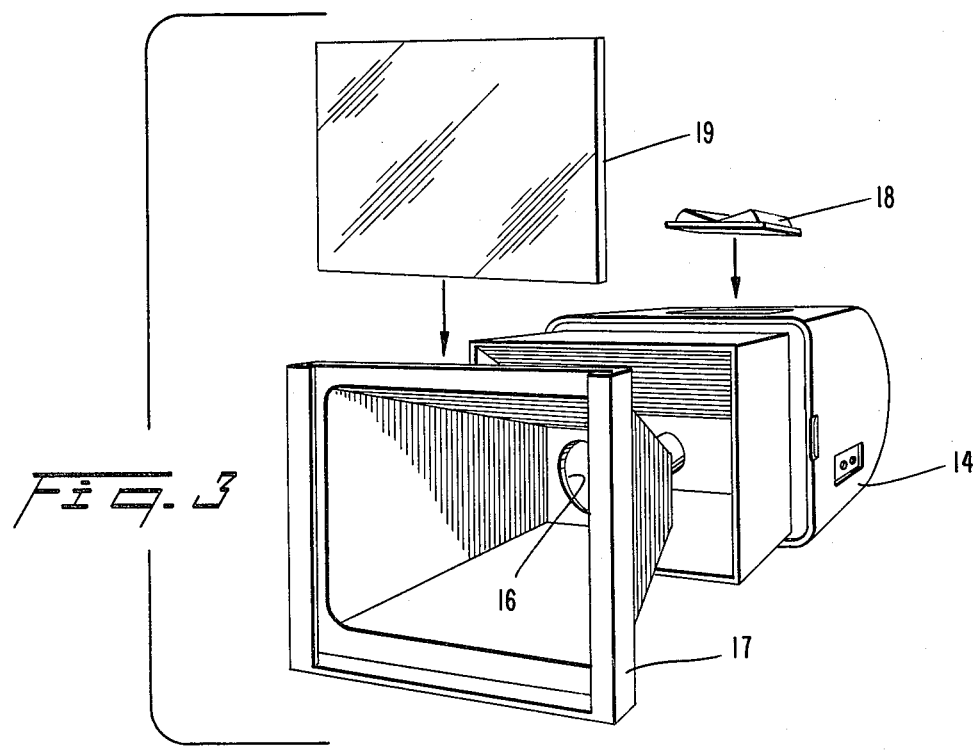
FIG. 3 is an exploded view of a light source assembly shown in FIG. 1.

As shown in more detail in FIG. 3, light source 12 includes a case 14 in which a light 16, light frame 17, and a translucent light panel 19 are secured. In order to use natural light, case 14 is removed from viewer 2. Translucent light panel 19 is also removable from viewer 2. Power for light source 12 may be a battery (not shown) located in light case 14 or from a source of AC (110-120 volt) power. In either case, a switch 18 is provided for control of light 16.

The embodiment of FIG. 4 is a film viewer 20 including a substantially hollow case 22 having open ends 24,26. A lens 28 is secured to the case 22 at open end 24 and a light source 30 is secured to the other open end 26.

The light source 30 includes a case 32 enclosing a light 34 and a battery (not shown). A switch 38 controls actuation of light 34.

It may be preferred to include a tape cassette 40 for use in conjunction with the viewer 2 and/or the viewer 20. Cassette 40 may be secured to the bottom of the case 4 as seen in FIGS. 1 and 2, or to the bottom of case 22 as in FIG. 4.

It may be preferred to provide a hood 48 to shield the lens 10 and 28 from unwanted light. The hood 48 may be of a telescoping type to permit more compact storage of the viewer.

In accordance with the invention, a channel guide means is provided disposed transverse the case between the light source and the lens for guiding and holding film channel means.

As illustratively depicted in FIGS. 2 and 5, a channel guide 50 may comprise elongated top and bottom members 52,54, respectively, with opposed ends 56,58. Two pair of spaced, parallel walls 60,62 are secured between top and bottom members 52,54 defining a longitudinal passage 57, between opposed ends 56,58. The pair of walls 60 is located proximate end 56 and the pair of walls 62 is located proximate end 58. Pairs of walls 60,62 are spaced from each other providing a central opening 64.

In the embodiment depicted in FIG. 2 and as better shown in FIG. 6, case 4 includes a transverse slot 66 cut into the top and side walls between light source 12 and lens 10. The case 4 is disposed in central opening 64 such that the longitudinal passage 57 is aligned with slot 66. To ensure proper alignment, rib 68 is integrally formed on the outside surface of case 4. Rib 68 cooperates with notch 70 of central opening 64 to guide and secure channel guide 50 in proper transverse position. Stop 72 and detent 74 ensure proper longitudinal positioning of guide 50. As shown best in FIG. 6, transverse slot 66 is defined within case 4 by opposite facing flanges 75.

In the alternative embodiment of FIGS. 4 and 7, a channel guide 76 comprises elongated top and bottom members 78,80, respectively, with opposed ends 82,84. Two pair of spaced parallel walls 86,88 are secured between top and bottom members 78,80 defining a longitudinal passage 90 between opposed ends 82,84. Pair of walls 86 is located proximate end 82 and pair of walls 88 is located proximate end 84. A set of two flanges 89 are located at the outer-most ends of walls 86,88 at right angles to the walls. Pairs of walls 86,88 are spaced from each other providing a central opening 92 between flanges 89.

Guide 76, in FIG. 4, is disposed in case 22 at case end 26 with central opening 92 between light source 30 and lens 28, and opposed ends 82,84 extending outside of case 22. Longitudinal passage 90 is located transverse case 22. Slits 94 in end 26 of case 22 and slots 96 in the end of light case 32 proximate case end 26 cooperate to secure channel guide 76 in position by engaging top and bottom members 78,80.

In accordance with the invention, a plurality of interchangeable film channel means are provided, each film channel means being adapted to slidably receive film strips of a particular size and having an opening to permit passage of light from the light source through the film to the lens. The size of the opening corresponds to the particular frame size of the film so as to preclude passage of excess light to the lens.

Illustratively, as seen in FIGS. 2, 5 and 8, film channel 98 comprises a pair of parallel, spaced walls 100,102 joined together by top and bottom members 104, 106 defining a film receiving passage 108. The walls 100,102 have centrally located congruent opening 110 having dimensions substantially corresponding to the frame size of a film 113 slidably received in passage 108.

The exterior dimensions of film channel 98 permit removable, interchangeable placement in channel guide 50 so as to align the central opening 110 of the film channel 98 in the path of light from light source 12 to lens 10. As may be seen in FIGS. 2 and 5, rib 114 on bottom member 106 of film channel 98 cooperates with notch 118 between walls 60,62 of channel guide 50 to guide insertion of film channel 98 into place in channel guide 50.

In the embodiment of FIGS. 2 and 5, the top member 52 of channel guide 50 has a centrally located slot 120 permitting insertion of film channel 98 directly into position in guide 50 and in position in slot 66 of case 4.

Film channel 98 is preferably locked into position between light source 12 and lens 10. As seen in FIG. 2, locking member 122 is slidably secured to case 4 proximate slot 66. Locking member 122 includes protrusions on the bottom thereof which slidably cooperate with grooves 124 and grooves 125 found at both ends of locking member 122. Notches 126 in rib 112 on top member 104 of film channel 98 are aligned with grooves 124 when film channel 98 is in proper position. Slidable movement of locking member 122 to engage notches 126 with the protrusions secures channel 98 in place. The bases of notches 126 preferably are aligned coincident to the plane of locking member 122. Stop 127 of case 4 and detent 129 adjacent stop 127, ensure that locking member 122 remains in place as required.

Individual film channels 98 have interior dimensions to slidably cooperate with a film strip of a particular size. Thus, a separate film channel 98 will be provided for film of sizes 35 mm, 16 mm, 8 mm and other sizes. Additionally, since each different size film has a particular size frame, the opening 110 of each film channel 98 dimensionally corresponds with the particular film frame size. This serves to frame the picture projected by light source 12 to lens 10 and precludes projection of excess light around the perimeter of the picture. Because of the interchangeable exterior dimensions of film channel 98, different film sizes may be easily accommodated for viewing merely by exchanging channel 98. Thus, without disassembly of the viewer 2 and with only the removal of one film channel 98 for another, the viewer 2 may be used to view film strips of various sizes.

As depicted in FIGS. 4, 7, and 9, an alternate film channel 128 comprise a pair of parallel, spaced walls 130,132 joined by top and bottom members 134,136 defining film receiving passage 138. The walls 130,132 have centrally located, congruent openings 140 having dimensions substantially corresponding to the frame size of film 142 slidably received in passage 138.

As noted with respect to the embodiment of FIGS. 2, 5, and 8, the exterior dimensions of film channel 128 permit removable, interchangeable placement in channel guide 76 so as to align opening 140 in the path of light from light source 30 to lens 28. In this embodiment, opening 92 in channel guide 76, which is located in the light path, has dimensions at least as large as the largest frame size of any film which may be accommodated. In film channel 128, opening 140 varies in dimension depending on film size and frame size, and serves to frame the picture depicted on lens 28.

Channel 128 has ribs 142, 144 on top and bottom members 134,136, respectively, for slidably engaging grooves 146,148 on the inside of top and bottom members 78,80 of guide 76 to guide and secure film channel 128 in place.

It may be desirable to view two films simultaneously. Accordingly, an embodiment of the invention permits easy modification of the viewer for that purpose. As seen in FIG. 10, a channel guide 150 and film channel 152 are modifications of film channel guide 50 and film channel 98 of FIGS. 2, 5, and 8. To avoid confusion, common parts have been given the same number.

Channel guide 150 has top and bottom members 52,54 and two pairs of spaced, parallel walls 60,62 joined together to form central opening 64, and a longitudinal passage 57 between opposed ends 56,58. Channel guide 150 is interchangeable with guide 50 by removing channel guide 50 from its location between stop 72 and detent 74 and slidable disengaging notches 70 from ribs 68. The light case 14 has dimensions which permit slidably removing guide 50 over light case 14. Channel guide 150 may be placed in and removed from its position around case 4 in the same manner as channel guide 50.

To accommodate two separate film strips simultaneously, channel guide 150 has a middle member 154 secured to pairs of walls 60,62 in substantially parallel relationship with top and bottom members 52,54, and having opposed ends 157,159 substantially congruent with opposed ends 56,58 of top and bottom members 52,54. Middle member 154 is essentially divided into two sections 156,158 since the central portion of middle member 154, corresponding to the transverse dimension of opening 64, is eliminated. This is necessary to permit passage of channel guide 150 around case 4. If middle member 154 is located on walls 60,62 adjacent notches 70, a further portion is eliminated to avoid conflict with passage of ribs 68 through notches 70. While channel guide 150 is depicted in FIG. 10 with middle member 154 located substantially midway between top and bottom members 53,54, middle member 154 may be located at other places between and parallel to top and bottom members 52,54.

Film channel 152 is structurally the same as channel 98 of FIGS. 5 and 8 except for the addition of third member 160 secured between walls 100,102 and located between and parallel to top and bottom members 104,106. The location of third member 160 will generally correspond to the location of middle member 154 of guide 150. However, since it may be desirable to simultaneously view two films of different sizes, the location of third member 160 between top and bottom members 104,106 of film channel 152 may be different in separate, interchangeable channels depending on the two film sizes to be viewed.

Third member 160 defines two film receiving passages 162,164 for slidably receiving two separate film strips 166,168 and defines two openings 167,169 for framing the frames of the two film strips 166,168. Due to middle member 154, film channel 152 is placed in channel guide 150 through slot 120, and is secured in position by lock member 122 in the manner discussed above with respect to film channel 98 of FIG. 2. Thus, viewer 2 may be modified to accommodate two film strips by removing and replacing channel guide 50 with channel guide 150, and the size of the two film strips simultaneously viewed may be changed merely by interchanging different film channels 152.

FIG. 11 depicts an illustrative embodiment of a film guide 132 for use with the embodiment of FIG. 4 to accommodate two film strips simultaneously. Except for the addition of middle member 170, the elements of film guide 172 of FIG. 11 are the same as those of film guide 76 of FIGS. 4, 7 and 8. Middle member 170 is secured to pairs of walls 86,88 between and parallel to top and bottom members 78,80 and has opposed ends 174,176 substantially congruent with opposed ends 82,84 of top and bottom members 78,80. Additionally, middle member 170 has top and bottom grooves 178 (only one shown) cooperating with grooves 146, 148 on top and bottom members 78,80 for slidably receiving and securing film channels in place. Film channels 128 are removably disposed in each longitudinal passage 180, 182 defined by middle member 170 between top and bottom members 78,80, respectively, with openings 140 in each channel 128 aligned with central openings 184,186 defined by middle member 170, pairs of walls 86,88 and top and bottom members 78,80. Of course, the exterior dimensions of the film channel 128 for use with channel guide 172 will correspond to the dimensions of longitudinal passages 180,182.

It is preferred that spool means rotatably secured to the opposed ends of channel guide means be provided for holding and slidably moving film strips through film channel means in the channel guide means.

FIG. 12 shows spools 188,190 on which film is wound. The space between end flanges 192,194 of spools 188,190 will vary in different spools depending on the size of film to be slidably passed through the film channel in the viewer.

As seen in FIG. 2 the spool means also include means for rotatably securing the spools 188, 190 at the opposed ends 56,58, 82,84 of guides 50, 76. Various known means for rotatably securing spools 188 may be used. As depicted in FIGS. 2 and 13, knobs 195,196 are provided for engaging ends 198 of spools 188 through holes 200 in the opposed ends 56,58, of the top and bottom members 52,54 of guide 50. Since the opposed ends 56,58 extend outside case 4, easy access is provided for rotating spools 188 to sequentially present frames of film strips for viewing and for removing and changing spools 188. As shown in FIG. 4, holes 200 also are provided in the opposed ends 82,84 of the top and bottom members 78,80 of guide 76 for mounting of spools 188.

Where two film strips are to be viewed simultaneously, the middle members 154,170 of guides 150, 172 in FIGS. 10 and 11 have raised seats 202 on both sides of each opposed ends 157,159, 174,176. The seats 202 are coaxial with holes 200 and are received within ends 198 of spools 188, 190 preventing lateral movement of the spools while permitting their rotation. Of course, four spools are required to slidably move two film strips through the viewer using film guide means 150,172.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or scope of applicant's general inventive concept.

What is claimed is:

1. A hand-held filmstrip viewer comprising:
 (a) a case defining a light path, said case including a slot which is in a plane perpendicular to said light path and is open on three sides of said case;
 (b) means for introducing light to one end of said light path;
 (c) means for viewing said light at the other end of said light path;
 (d) means for mounting a filmstrip to intersect said light path, said means for mounting including:
  (1) film channel means having first and second parallel walls and having a film strip receiving first passage therebetween, said first passage being open at both ends through which said filmstrip may slidably pass, said first and second walls having openings therein aligned with each other to permit visual access to said filmstrip within said first passage; and
  (ii) channel guide means, mounted to said case and having a second passage dimensioned to slidably receive said film channel means, for removably mounting said film channel means in said case to allow said light to pass through said filmstrip when said filmstrip is located in said first passage of said film channel means and said film channel means is located in said second passage of said channel guide means, and wherein said channel guide means includes a case receiving opening and said case is positioned within said opening with said second passage of said channel guide means lying in said plane of said slot.

2. The viewer of claim 1 wherein said slot is defined within said case by opposite facing flanges.

3. The viewer of claim 1 wherein said case comprises a first section housing said means for viewing and a second separable section.

4. The viewer of claim 3 wherein said channel guide means is located at the junction of said first and second sections.

5. The viewer of claim 3 wherein said means for introducing light comprises a removable translucent light panel located in said second section.

6. The viewer of claim 3 wherein said means for introducing light comprises a source of light located in said second section.

7. The viewer of claim 1 wherein said channel guide means includes means for slidably moving a filmstrip through said first passage of said film channel means.

8. The viewer of claim 1 or 4 further including a plurality of said film channel means, each removably placeable one at a time in said second passage of said channel guide means, each film channel means being adapted to slidably receive in said first passage thereof, a filmstrip of a particular size, and said openings of said first and second walls of each film channel means having dimensions substantially corresponding to said particular size of the filmstrip for which the film channel means is adapted.

9. A hand-held viewer comprising:
(a) a case defining a light path;
(b) means for introducing light to one end of said light path;
(c) means for viewing said light at the other end of said light path;
(d) means for mounting a filmstrip to intersect said light path, said means for mounting including:
  (i) film channel means having first and second parallel walls and having a film receiving first passage therebetween, said first passage being open at both ends through which said filmstrip may pass, said first and second walls having openings therein aligned with each other to permit visual access to said filmstrip within said first passage; and
  (ii) channel guide means, fixed to said case and having a second passageway dimensioned to slidably receive said film channel means, for removably mounting said film channel means in said case to allow light to pass through said filmstrip when said filmstrip is located in said first passage of said film channel means and said film channel means is located in said second passage of said channel guide means, wherein said channel guide means comprises elongated top and bottom members with opposite ends and two parallel walls secured between said top and bottom members, said walls of said channel guide means defining said second passageway and each wall having an opening aligned with the openings in the walls of said film channel means when said film channel means is positioned in said second passage of said channel guide means and wherein said channel guide means further includes spool means rotatably secured at each of said opposite ends for holding and slidably moving said filmstrip through said film channel means.

10. The viewer of claim 9 further including a plurality of said film channel means, each removably placeable one at a time in said second passage of said channel guide means, each film channel means being adapted to slidably receive in said first passage thereof a filmstrip of a particular size, and said openings of said first and second walls of each film channel means having dimensions substantially corresponding to said particular size of the filmstrip for which the film channel means is adapted.

11. The viewer of claim 9 including a plurality of said film channel means, and wherein said channel guide means further comprises a middle member disposed between and parallel to said top and bottom members in a manner which intersects said openings in the walls of said film channel means, to define two separate parallel first passages for receiving in each, one of said film channel means.

12. The viewer of claim 11 wherein said middle member comprises two separate sections, secured between said walls of said channel guide means on opposite sides of said openings leaving the openings of the walls of said film channel means unobstructed.

13. The viewer of claim 11 wherein said middle member divides said openings in the walls of each channel guide means into two adjacent openings, which align with the openings in the walls of said film guide means when said film guide means are positioned in said parallel first passages.

14. The viewer of claim 11 wherein said middle member has opposite ends aligned with said opposite ends of said top and bottom members, and said channel guide means includes means rotatably secured at each of said opposite ends for holding and independently slidably moving one filmstrip through each of said parallel first passages of said film channel means.

15. The viewer of claim 1 or 9 wherein said film channel means is insertable into said second passage of said channel guide means along the longitudinal axis of said second passage.

16. The viewer of claim 9 wherein said film channel means is insertable into said second passage of said channel guide means through said top member of said channel guide means.

17. The viewer of claim 1 or 9 wherein said openings of said first and second walls of said film channel means are dimensioned to frame a frame of said film strip.

* * * * *